United States Patent [19]

Long

[11] Patent Number: 4,813,533

[45] Date of Patent: Mar. 21, 1989

[54] CONVEYOR BELT

[75] Inventor: Barry W. Long, Copley, Ohio

[73] Assignee: The Goodyear Tire & Rubber Company, Akron, Ohio

[21] Appl. No.: 717,620

[22] Filed: Mar. 29, 1985

Related U.S. Application Data

[62] Division of Ser. No. 344,109, Jan. 29, 1982, Pat. No. 4,526,637.

[51] Int. Cl.$^4$ .............................................. B65G 15/34
[52] U.S. Cl. ...................................................... 198/847
[58] Field of Search ................ 198/847, 846; 156/137; 474/261, 266, 268; 428/246, 284, 286, 102

[56] References Cited

U.S. PATENT DOCUMENTS

| | | | |
|---|---|---|---|
| 1,405,158 | 1/1922 | Petersen | 198/847 |
| 2,310,819 | 2/1943 | Van Orden | 198/847 |
| 2,800,701 | 7/1957 | Watts et al. | 198/847 |
| 2,955,969 | 10/1960 | Runton | 198/847 |
| 3,393,115 | 7/1968 | Hainsworth et al. | 198/847 |
| 3,620,897 | 11/1971 | Tanimoto et al. | 198/847 X |
| 4,154,335 | 5/1979 | Burnett et al. | 198/847 |
| 4,157,752 | 6/1979 | Sick et al. | 198/847 |

FOREIGN PATENT DOCUMENTS 2229496  1/1973  Fed. Rep. of Germany ...... 198/847

Primary Examiner—Robert J. Spar
Assistant Examiner—Cheryl L. Gastineau
Attorney, Agent, or Firm—M. R. Dion, Sr.

[57] ABSTRACT

A flat belting includes a plurality of individual layers of fabric that extend throughout the length and width of the belting. The layers are joined together by reinforcing elements which extend substantially in the direction of the thickness of the belting. The individual layers and reinforcing elements are encapsulated in a matrix of polymeric elastomeric resin, for example, polyvinylchloride. The individual layers are saturated with a liquid elastomer-forming polymeric resin prior to their being joined together. The reinforcing elements may be inserted, for example, by tufting, sewing, or stitch-bonding. One or more of the individual fabric layers may be a woven or other cloth having a plurality of substantially parallel yarns which extend in the lengthwise direction of the belting. One or more of the individual fabric layers may be a non-woven fabric.

2 Claims, 2 Drawing Sheets

CONVEYOR BELT

This is a division of application Ser. No. 344,109 filed on Jan. 29, 1982, now U.S. Pat. No. 4,526,637, issued July 2, 1985.

The abstract is not to be taken as limiting the invention of this application and in order to understand the full nature and extent of the technical disclosure of this application, reference must be made to the accompanying drawing and the following detailed description.

This invention relates to flat belting and more particularly this invention relates to conveyor belting and to a method of its manufacture.

Figure 1:
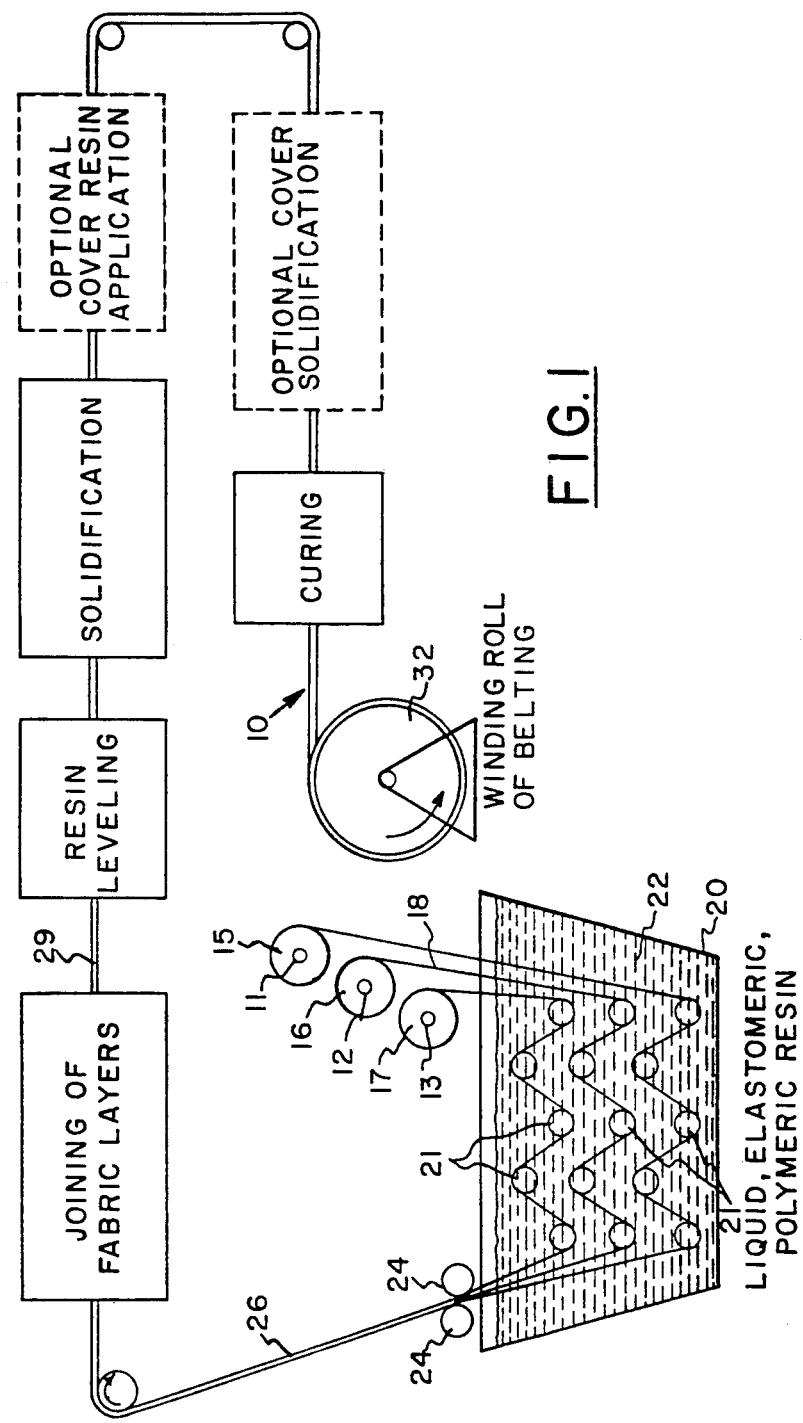
Figure 2:
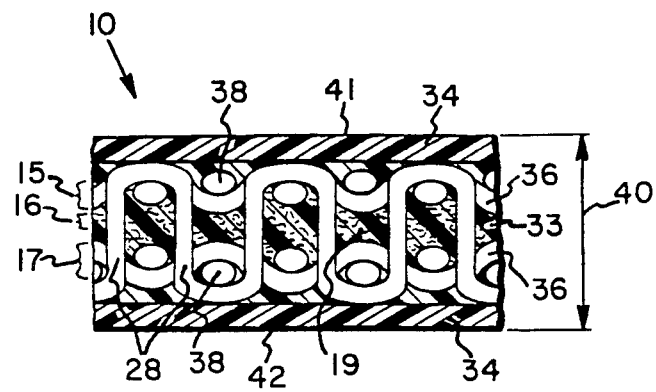

The invention may be better understood by reference to the accompanying drawing in which like numerals are employed to indicate like items in the various views and in which:

FIG. 1 is a schematic side elevation illustrating a method for manufacture of belting according to the invention; and FIG. 2 is a side elevation partially in section of a fragment of belting according to the invention.

The invention will be described with regard to the manufacture and construction details of a conveyor belting that is formed of three plies or layers of fabric that are joined together and encapsulated in fused polyvinylchloride. It is to be understood, however, that the invention is not intended to be limited to this example.

Referring now to FIG. 1, a method for the manufacture of flat conveyor belting 10 is illustrated. Each of the let-offs 11, 12, 13 is equipped with a roll 15, 16, 17, respectively, of fabric. The fabrics may be woven or knit or non-woven fabrics or bats. In FIG. 1, the fabric layers 15 and 17 being unwound from let-offs 11 and 13 are square woven fabrics each of which has a plurality of substantially parallel warp cords which extend throughout the length of the fabric and the belting 10 formed therefrom. The term "substantially parallel", as used herein, means that the yarn or cords of individual fabric layers do not cross over one another. The warp yarns or cords should be of a relatively high tensile strength to minimize stretching of the belting 10 under longitudinally applied load or tension. The fabric layer 16 to be dispensed from let-off 12 is a non-woven mat or bat 18.

The yarns or cords of the fabric layers 15, 17 or the fibers of the mat layer 16 may be selected from a wide variety of synthetic materials, such as polyester, polyamides, and the like. The yarns or cords of fabric layers 15 and 17 will provide the primary resistance to elongation of the belting 10 to be produced, as well as transverse rigidity and splice-holding characteristics.

The non-woven fabric mat or bat 18 is provided primarily to absorb and hold the resin-forming liquid 22 and to add substance and body to the belting 10 to be produced.

The non-woven fabric bat 18 may be of staple fibers which are entangled with one another by a needle-punching operation or are spun-bonded to one another with an adhesive. Both of these methods of forming a bat or non-woven fabric are considered conventional and will not be discussed further here.

The three layers of fabric 15, 16, 17, respectively are directed from the respective let-offs 11, 12, 13 into a saturator tank 20. The longitudinally applied tension in the individual fabric layers 15, 16, 17 at this time is quite low and need only be sufficient to draw the fabric layers from their respective let-offs 11, 12, 13 through the saturator tank 20. A plurality of rolls 21 may be positioned in the tank 20 to cause reversals of fabric direction and thereby enhance penetration of the liquid resin 22. Introducing the fabric layers 15, 16, 17 individually into the saturator tank 20 facilitates complete saturation of the fabric layers with liquid polymeric resin 22. While a single saturator tank 20 and single bath of liquid polymeric resin 22 are illustrated, it is to be understood that individual saturator tanks (not illustrated) filled with liquid polymeric resin are also in contemplation of the invention and are considered an equivalent.

After the individual fabric layers 15, 16, 17 have been wetted with a liquid polymeric resin 22, they are pressed together, for example, by passing them through a pair of opposed rollers 24 at the exit or near the exit of the saturator tank 20. This operation removes any excess of liquid polymeric resin 22 and allows it to fall back into the saturator tank 20 and consolidates the saturated fabric layers 15, 16, 17 into a unit 26 having a combined or overall thickness which is defined by the spacing between the rollers.

Upon exit from the rollers 24, the fabric layers 15, 16, 17 are tensioned in their lengthwise direction an amount greater than that which was applied to them between the let-offs 11, 12, 13, respectively, and the pair of opposed rollers 24. While the saturated fabric layers 15, 16, 17 are at the increased level of tension, they are joined together by reinforcing elements 28 (refer to FIG. 2) which extend in a direction of the thickness of the fabric layers 15, 16, 17. This may be accomplished, for example, by sewing, stitch-bonding, or tufting, with yarn or cord. The terms "sewing", "tufting", and "stitch-bonding", are well understood by those skilled in the art and will not be described or discussed in further detail.

The joined fabric layers 29 are preferably further tensioned for all subsequent process steps except takeup. The joined fabric layers 29 are passed between a pair of opposed scrapers (not illustrated) to level out the liquid polymeric resin 22. Thereafter, the liquid resin saturant 22 is solidified, for example, by drying or gelling. When the liquid saturant is a polyvinylchloride plastisol, the resin is gelled by application of heat. The term "gelling" as used here, means that the polyvinylchloride plastisol becomes solid and will not thereafter flow at room temperature but its physical properties are not yet fully developed. Gelling of polyvinylchloride plastisol may be accomplished by heating the liquid plastisol to temperature of at least 200–220 degrees F. The temperature and time required for gelling to occur are, of course, a function of the specific polyvinylchloride plastisol chosen and readily available from the supplier of the plastisol or easily determined by experiment. In the instance in which a liquid resin including a carrier or solvent is employed, the carrier or solvent is evaporated. It is to be understood that liquid resins without carriers or solvents may be used and in this instance partial curing or vulcanization may be effected at this point in the process to solidify the resin saturant.

The belting 10 may now be completed by curing of the resin saturant to fully develop its physical properties. In the case where the liquid polymeric resin is a polyvinylchloride plastisol, the resin is cured by completely fusing the polyvinylchloride plastisol, for example, at temperatures in the range of 320 to 350 degrees F. In the instance where latices or liquid rubbers or other polymer systems are employed the polymer is cured or vulcanized or caused to cross-link or polymerize and thereby develop fully its physical properties. Thereafter, the belting 10 is taken up on a wind-up 32.

Optionally, the saturated joined fabric layers after solidification of the liquid resin saturant may have a layer of cover resin applied, for example, by a second immersion operation and a second dip tank (not shown) or by means of doctor blades (not shown) which spread the cover layer over one or both surfaces of the belting. Following application of the cover layer resin, the cover layer 34 (in FIG. 2) is solidified and thereafter the belting is cured to fully develop the physical properties of the polymeric resin materials. Thereafter, the belting 10 is taken up on the wind-up 32.

While the invention has been described with respect to a conveyor belt 10 whose fabric layers are saturated with polyvinylchloride, it is to be understood that a wide range of liquid polymeric resins may be employed. Representative are the liquid precursors for neoprene, styrene, butadiene, polyurethane, carboxylated acrylonitrile/butadiene, copolymers, and the like. The liquid polymeric resins may be pure or include a carrier such as water or a solvent.

Saturating the fabric layers 15, 16, 17 individually facilitates penetration of the textile fabrics with the liquid polymeric resin 22 so as to encapsulate each fabric layer 15, 16, 17 and the individual fibers and/or yarns thereof. It is desired that all voids in the textile fabric layers be filled with elastomer. In the completed cured belting 10, the polymeric resin matrix 33 in FIG. 2 may comprise a majority of the weight.

Curing of the saturated joined fabric layers may be effected by any means appropriate for the polymeric resin saturant, for example, when the polymeric resin is a polyvinylchloride plastisol, heat is applied. Curing may be effected at atmospheric pressure in the instance of a polyvinylchloride plastisol although the use of a heated platen or rotary press at a temperature sufficient to cure the resin is within contemplation of the invention and is preferred to impart an even gauge and appearance to the belting. Those skilled in the art recognize that press curing is mandatory for certain ones of polymeric resins.

A fragment of belting 10 like that whose manufacture has previously been described herein is illustrated in FIG. 2. The belting 10 consists of a pair of woven warp cord fabrics 15, 17 respectively located adjacent to opposite flat sides 41, 42, respectively, of the belt 10. Each warp cord fabric 15, 17 includes textile warp yarns 36 that extent in the lengthwise direction of the fabric 15, 17 and belting 10. The yarns 36 of each fabric 15, 17 are joined together by crosswise extending weft yarns 38. Interposed between the woven fabric layers 15, 17 is a non-woven fabric layer 16. The non-woven fabric layer 16 is formed of a plurality of staple fibers 19 which are spun-bonded to one another. Due to limitations in illustrating, only a few fibers 19 of the non-woven fabric 16 have been shown in FIG. 2. The number and density of the fibers 19 is much greater in reality. The non-woven fabric layer 16 is provided to add bulk and thickness to the belt and to aid in picking up the liquid polymeric resin saturant 22. The outer warp cord fabric layers 15 and 17 and the non-woven fabric layer 16 are joined to one another by reinforcing cords or yarns 28 which extend in a direction of the thickness 40 of the belt 10. A matrix 33 of polymeric elastomeric resin encapsulates the individual fabric layers 15, 16, 17 and the reinforcing yarns 28.

The following example describes the manner and process of making and using the invention and sets forth the best mode contemplated by the inventor of carrying out the invention, but is not to be construed as limiting the invention.

EXAMPLE

A heavy-duty conveyor belting having three fabric layers is made as follows: Each of the two outer fabric layers is polyester-nylon belt duck having 55 warp cords per inch of fabric width and 12 weft cords per inch of fabric length. The warp cords are of polyester. Each warp cord contains two yarns of 1,000 denier each and has a twist of three turns per inch. The weft cords are of nylon 66. Each weft cord contains three yarns of 1,260 denier each and has a twist of two and one-half turns per inch. Each individual outer fabric layer has a greige gauge or thickness of 0.050 of an inch. The greige fabric when tested for resistance to tension applied in the warp direction ruptures at about 2,000 pounds force per inch of fabric width. The greige outer fabric when tested for resistance to tension applied in the direction of the weft cords ruptures at about 1,000 pounds force per inch of fabric width. Each of the outer fabric layers is of four harness balanced crowfoot weave.

The intermediate fabric layer is a spun polyester, non-woven, needled felt having a greige weight of 16 ounces per square yard and a greige gauge of 0.110 inch. The greige felt when tested for resistance to tension applied in the lengthwise direction of the felt ruptures at about 125 pounds force per inch of fabric width.

The reinforcing cord used in joining the outer and inner fabric layers to one another consists of two yarns of 1,000 denier each and has a twist of 12 turns per inch in both the yarns and the cord.

Each of the three fabric layers are dipped separately but concurrently in polyvinylchloride plastisol resin saturant having a viscosity of about 2,000 centipoise at ambient temperature (75° F.) Each of the fabric layers is at minimal tension while submerged in the plastisol, that is, less than 2 pounds force tension per inch of fabric width. Each of the fabric layers is immersed in the plastisol for about seven seconds to assure saturation of the fabric with the plastisol.

The saturated fabric layers are squeezed or sized by passing them through a pair of opposed rollers which reduce the thickness of the saturated fabric layers by about five percent. Immediately thereafter the saturated fabric layers are passed through a stitch-bonding machine. Thereafter the joined, saturated fabric layers are passed through a plurality of squeeze/hold back rolls which further reduce the gauge of the unsaturated and joined fabrics by about five percent. Thereafter the joined fabrics are passed into a hot air oven having an internal temperature of about 320°-350° F. to gel the plastisol. Gelling takes place in about 10 minutes in this temperature range. Tension is applied to the joined fabric layers while they are exposed to the gelling temperature to limit shrinkage in the warp direction of the fabric to two percent maximum.

Thereafter the joined fabric layers having the gelled saturant thereon are passed through a second polyvinylchloride plastisol contained in a cover dip tank. The cover-forming plastisol is maintained at a temperature of 100° F. maximum. Upon exiting the cover dip tank, the flat, major surfaces of the incomplete belting are scraped to remove any excess of cover-forming plastisol. The polyvinylchloride plastisol utilized for the cover has a much greater viscosity than that utilized to saturate the fabric layers. The viscosity of the cover plastisol is about 35,000 centipoise at ambient temperature (°F.) Cover thickness is one-quarter inch on each side of the belt. Cover thickness is a matter of choice based on intended service for the belting and typically is not less than 3/32 or more than ⅜ of an inch. After the excess cover-forming plastisol has been removed, the incomplete belting is passed through radiant heat units to gel the cover-forming plastisol. Thereafter the incomplete belting enters an oven and is exposed for 15 to 25 minutes to temperatures in the range of 320° to 350° F. (depending on the cover thickness and formulation) to cure the resin saturant and cover-forming plastisol to full development of their physical properties. The belting is thereafter fed into a continuous rotary press for final cure and surface embossing if desired. Thereafter the belting is cooled down by exposure to air or water and is wound into a roll.

The belting whose manufacture has just been detailedly described has the following characteristics: It is suitable for a working tensile load of 200 pounds force per inch width. When tested for resistance to tension applied in the lengthwise direction of the belting, rupture occurs at 4,200 to 4,500 pounds force per inch of belt width. When tested for resistance to tension applied in the direction of the width of the belting, rupture occurs at about 2,000 to 2,200 pounds force per inch of belt width. The three plies of fabric in the completed belting have an overall, or combined gauge or thickness of about 0.200 inch. The total thickness of the completed belting including upper and lower cover layers is about 0.700 inch since each cover layer has a thickness of about one-quarter inch.

While certain representative embodiments and details have been shown for the purpose of illustrating the invention, it will be apparent to those skilled in the art that various changes and modifications may be made therein without departing from the spirit or scope of the invention.

I claim:

1. A conveyor belt comprising: a center non-woven fabric of randomly distributed staple fibers; a first fabric layer and a second fabric layer positioned on opposite sides of said center non-woven fabric, said first and second fabric layers being woven or knitted of a multiplicity of substantially parallel warp yarns extending in the lengthwise direction of the belting and including a plurality of weft yarns extending perpendicular to said warp yarns; a multiplicity of reinforcing yarns extending substantially in the direction of the thickness of the belting and joining said center non-woven fabric to said first and second fabric layers; and an elastomeric matrix formed from a liquid polymeric elastomeric resin, said elastomeric matrix completely encapsulating said non-woven fabric layer, said first fabric layer, said second fabric layer and said reinforcing yarns.

2. A flat belting which comprises:
   a plurality of individual layers of woven or knitted fabric having a multiplicity of interwoven, warp and weft yarns that extend throughout the length and width of the belting; a multiplicity of reinforcing yarns that extend substantially in the direction of the thickness of the belting, joining said individual layers of woven fabric;
   a matrix of polymeric elastomeric resin encapsulating the individual layers and said reinforcing yarns; and
   a non-woven fabric of staple fibers completely encapsulated by said polymeric elastomer resin and joined to said individual layers of woven or knitted fabric by said multiplicity of reinforcing yarns.

* * * * *